(12) United States Patent
Groten

(10) Patent No.: US 6,946,068 B2
(45) Date of Patent: Sep. 20, 2005

(54) PROCESS FOR DESULFURIZATION OF CRACKED NAPHTHA

(75) Inventor: Willibrord A. Groten, Pasadena, TX (US)

(73) Assignee: Catalytic Distillation Technologies, Pasadena, TX (US)

( * ) Notice: Subject to any disclaimer, the term of this patent is extended or adjusted under 35 U.S.C. 154(b) by 468 days.

(21) Appl. No.: 09/877,277

(22) Filed: Jun. 8, 2001

(65) Prior Publication Data

US 2003/0230517 A1 Dec. 18, 2003

Related U.S. Application Data

(60) Provisional application No. 60/210,716, filed on Jun. 9, 2000.

(51) Int. Cl.[7] ............................ C10G 45/04; B01D 3/34
(52) U.S. Cl. ..................... 208/213; 208/209; 203/28; 203/32
(58) Field of Search ............................... 208/213, 209; 203/28, 32

(56) References Cited

U.S. PATENT DOCUMENTS

| 5,320,742 A | 6/1994 | Fletcher et al. ............... 208/89 |
| 5,597,476 A | 1/1997 | Hearn et al. ................. 208/208 |
| 5,779,883 A | 7/1998 | Hearn et al. ................. 208/213 |
| 6,083,378 A | 7/2000 | Gildert et al. .............. 208/209 |
| 6,231,752 B1 * | 5/2001 | Putman ...................... 208/213 |
| 6,303,020 B1 * | 10/2001 | Podrebarac et al. ........ 208/210 |
| 6,416,658 B1 * | 7/2002 | Maraschino et al. ........ 208/189 |
| 6,444,118 B1 * | 9/2002 | Podrebarac et al. ........ 208/210 |
| 6,495,030 B1 * | 12/2002 | Podrebarac et al. ........ 208/218 |

* cited by examiner

Primary Examiner—Tam Nguyen
(74) Attorney, Agent, or Firm—Kenneth H. Johnson

(57) ABSTRACT

A process for concurrently fractionating and hydrotreating of a full range naphtha stream. The full boiling range naphtha stream, for example which is derived from fluid catalytic cracking, is first subjected to simultaneous hydrogenation of the thiophene contained therein and thioetherification and fractionation to remove the mercaptans the light fraction and then to simultaneous hydrodesulfurization and splitting of the bottoms into an intermediate boiling range naphtha and a heavy boiling range naphtha. The three boiling range naphthas are treated separately according to the amount of sulfur in each cut and the end use of each fraction.

8 Claims, 1 Drawing Sheet

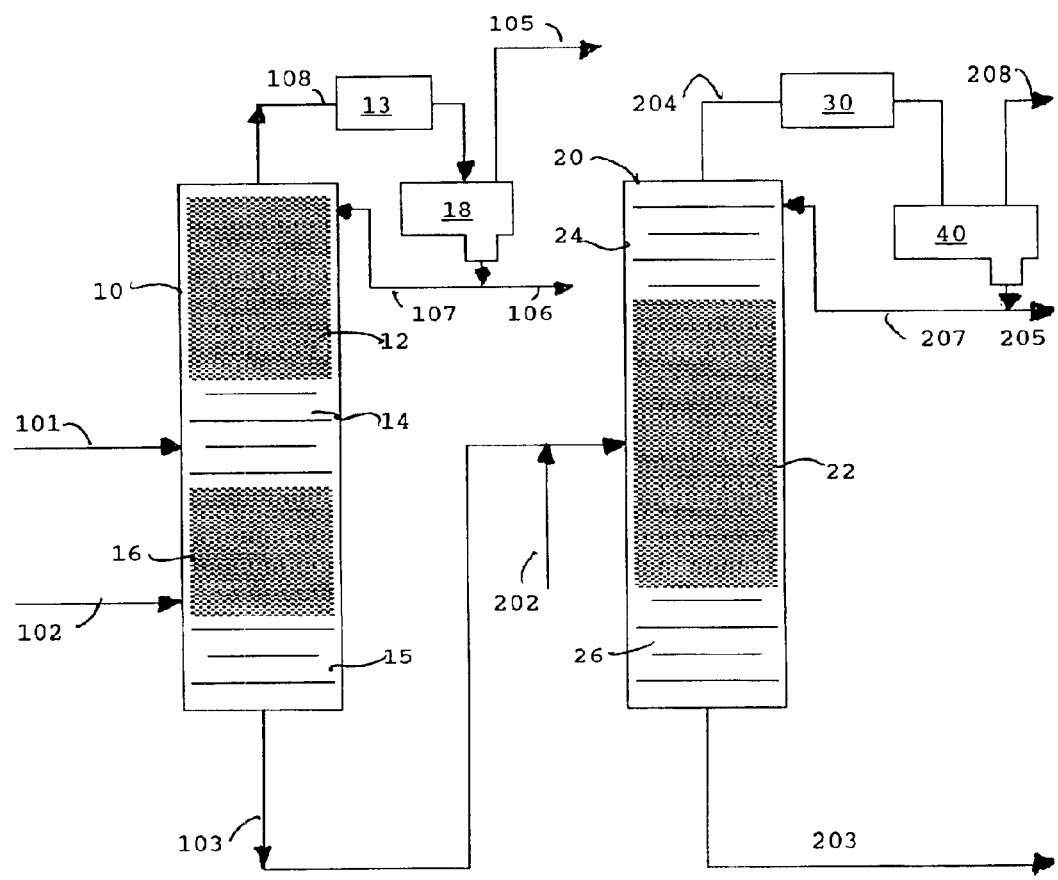

PROCESS FOR DESULFURIZATION OF CRACKED NAPHTHA

This application claims the benefits of provisional application No. 60/210,716 which filed on Jun. 9, 2000.

BACKGROUND OF THE INVENTION

1. Field of the Invention

The present invention relates to an improved process for the removal of sulfur compounds from a full boiling range naphtha, preferably fluid catalytically cracked. More particularly the invention relates to an improved process for removal of the thiophenes from the lower boiling or light fluid catalytic cracked naphtha. More particularly the present invention relates to a process wherein thiophene contained in the naphtha is first converted to n-butyl mercaptan in a first reaction zone and the n-butyl mercaptan and other mercaptans are reacted with diolefins in a second reaction zone to form sulfides. The sulfide product of the mercaptan and diolefin reaction is higher boiling than the light naphtha fraction may be removed by fractional distillation. Very little of the mono olefins in the light fluid cracked naphtha is saturated.

2. Related Information

Petroleum distillate streams contain a variety of organic chemical components. Generally the streams are defined by their boiling ranges which determine the composition. The processing of the streams also affects the composition. For instance, products from either catalytic cracking or thermal cracking processes contain high concentrations of olefinic materials as well as saturated (alkanes) materials and poly-unsaturated materials (diolefins). Additionally, these components may be any of the various isomers of the compounds.

The composition of untreated naphtha as it comes from the crude still, or straight run naphtha, is primarily influenced by the crude source. Naphthas from paraffinic crude sources have more saturated straight chain or cyclic compounds. As a general rule most of the "sweet" (low sulfur) crudes and naphthas are paraffinic. The naphthenic crudes contain more unsaturates and cyclic and polycyclic compounds. The higher sulfur content crudes tend to be naphthenic. Treatment of the different straight run naphthas may be slightly different depending upon their composition due to crude source.

Reformed naphtha or reformate generally requires no further treatment except perhaps distillation or solvent extraction for valuable aromatic product removal. Reformed naphthas have essentially no sulfur contaminants due to the severity of their pretreatment for the process and the process itself.

Cracked naphtha as it comes from the catalytic cracker has a relatively high octane number as a result of the olefinic and aromatic compounds contained therein. In some cases this fraction may contribute as much as half of the gasoline in the refinery pool together with a significant portion of the octane.

Catalytically cracked naphtha gasoline boiling range material currently forms a significant part ($\approx\frac{1}{3}$) of the gasoline product pool in the United States and it provides the largest portion of the sulfur. The sulfur impurities may require removal, usually by hydrotreating, in order to comply with product specifications or to ensure compliance with environmental regulations, which may require the sulfur of the final product to be below 50 wppm.

The most common method of removal of the sulfur compounds is by hydrodesulfurization (HDS) in which the petroleum distillate is passed over a solid particulate catalyst comprising a hydrogenation metal supported on an alumina base. Additionally copious quantities of hydrogen are included in the feed. The following equations illustrate the reactions in a typical HDS unit:

$RSH + H_2 \rightarrow RH + H_2S$ (1)

$RCl + H_2 \rightarrow RH + HCl$ (2)

$RN + 2H_2 \rightarrow RH + NH_3$ (3)

$ROOH + 2H_2 \rightarrow RH + 2H_2O$ (4)

Typical operating conditions for the HDS reactions are:

| | |
|---|---|
| Temperature, °F. | 600–780 |
| Pressure, psig | 600–3000 |
| H$_2$ recycle rate, SGF/bbl | 1500–3000 |
| Fresh H$_2$ makeup, SCF/bbl | 700–1000 |

After the hydrotreating is complete, the product may be fractionated or simply flashed to release the hydrogen sulfide and collect the now desulfurized naphtha. The loss of olefins by incidental hydrogenation is detrimental by the reduction of the octane rating of the naphtha and the reduction in the pool of olefins for other uses.

In addition to supplying high octane blending components the cracked naphthas are often used as sources of olefins in other processes such as etherifications. The conditions of hydrotreating of the naphtha fraction to remove sulfur will also saturate some of the olefinic compounds in the fraction reducing the octane and causing a loss of source olefins.

Various proposals have been made for removing sulfur while retaining the more desirable olefins. Since the olefins in the cracked naphtha are mainly in the low boiling fraction of these naphthas and the sulfur containing impurities tend to be concentrated in the high boiling fraction the most common solution has been prefractionation prior to hydrotreating. The prefractionation produces a light boiling range naphtha which boils in the range of C$_5$ to about 250° F. and a heavy boiling range naphtha which boils in the range of from about 250–475° F.

The predominant light or lower boiling sulfur compounds are mercaptans while the heavier or higher boiling compounds are thiophenes and other heterocyclic compounds. The separation by fractionation alone will not remove the mercaptans. However, in the past the mercaptans have been removed by oxidative processes involving caustic washing. A combination oxidative removal of the mercaptans followed by fractionation and hydrotreating of the heavier fraction is disclosed in U.S. Pat. No. 5,320,742. In the oxidative removal of the mercaptans the mercaptans are converted to the corresponding disulfides.

Besides the mercaptans in the light cracked naphtha there can be a significant amount of thiophene which boils at about 180° F. The mercaptans can make up from 5 to 15% of the total sulfur in the fraction. If the thiophenes are not removed, the maximum total sulfur reduction possible on fractionation is 85–95% depending on the thiophene content.

U.S. Pat. No. 5,597,476 discloses a two-step process in which naphtha is fed to a first distillation column reactor which acts as a depentanizer or dehexanizer with the lighter material containing most of the olefins and mercaptans being boiled up into a first distillation reaction zone where the mercaptans are reacted with diolefins to form sulfides which are removed in the bottoms along with any higher boiling sulfur compounds. The bottoms are subjected to hydrodesulfurization in a second distillation column reactor where the sulfur compounds are converted to $H_2S$ and removed.

It is an advantage of the present invention that a full boiling range naphtha stream is hydrodesulfurized by splitting it into boiling range fractions which are treated to simultaneously hydrodesulfurize and fractionate the fractions. It is a further advantage of the present invention that the sulfur may be removed from the light portion of the stream to a heavier portion of the stream without any substantial loss of olefins. It is a particular feature of the present invention that substantially all of the sulfur contained in the naphtha is ultimately converted to $H_2S$ which is quickly removed from the catalyst zones and easily distilled away from the hydrocarbons without producing recombinant mercaptans and with reduced hydrogenation of olefins.

SUMMARY OF THE INVENTION

Briefly in the present invention a full boiling range naphtha stream containing organic sulfur compounds and diolefins is fractionated in a first distillation column reactor. The first distillation column reactor contains two reaction zones—1) a first distillation reaction zone in the lower portion of the column containing a catalyst suitable for reacting thiophene with hydrogen to produce n-butyl mercaptan, and 2) a second distillation reaction zone containing a catalyst suitable for reacting mercaptans with diolefins to produce sulfides. The mercaptans in the stream along with the n-butyl mercaptan produced in the first zone along with the diolefins are boiled upward into the second reaction zone at the upper end of the distillation column reactor to contact it with a Group VIII metal hydrogenation catalyst under conditions to form sulfides. A lower boiling portion of the stream, having a reduced amount of organic sulfur compounds and diolefins is recovered as light naphtha overheads. The sulfides formed by the reaction of the mercaptans and diolefins are higher boiling and are removed from the column in a heavier bottoms. The heavier bottoms comprise that portion of the stream not removed as overheads. Hydrogen is present in the column sufficient to support the hydrogenation of the thiophene and to maintain the catalyst in the hydride form for the sulfide reaction and very little of the olefins present are hydrogenated. Furthermore, the presence of diolefins in this fraction deters olefin hydrogenation, since the diolefins are preferentially hydrogenated.

The heavier bottoms and hydrogen may be fed to a second distillation column reactor, where the heavier bottoms are fractionated into an intermediate naphtha portion and a heavy naphtha portion. The organic sulfur compounds in the intermediate naphtha portion are brought into contact with hydrogen in the presence of a hydrodesulfurization catalyst under conditions to convert the organic sulfur compounds to $H_2S$ which is removed with the intermediate naphtha portions as an intermediate naphtha overheads. Higher boiling organic sulfur compounds originally present in the stream and the sulfides produced in the first column are removed with a heavy naphtha portion as bottoms. If desired no bottoms draw would be necessary, resulting in only a heavy cracked naphtha.

As used herein the term "distillation column reactor" means a distillation column which also contains catalyst such that reaction and distillation are going on concurrently in the column. In a preferred embodiment the catalyst is prepared as a distillation structure and serves as both the catalyst and distillation structure.

The sulfur compounds produced in the first distillation column reactor by the reaction of mercaptans and diolefins are organic sulfur compounds, however, for the purposes of describing and claiming the present invention the organic sulfur compounds, other than mercaptans, contained in the full boiling range naphtha stream feed to the present process are designated as "organic sulfur compounds" and the sulfur compounds produced by the reaction mercaptans and diolefins are designated as "sulfides". The term "sulfur compounds" is used herein to generically include the mercaptans, sulfides and organic sulfur compounds.

BRIEF DESCRIPTION OF THE DRAWING

The FIGURE is a flow diagram in schematic form of the preferred embodiment of the invention.

DETAILED DESCRIPTION OF THE INVENTION

The feed to the process comprises a sulfur-containing petroleum fraction from a fluidized bed catalytic cracking unit (FCCU) which boils in the gasoline boiling range($C_5$ to 420° F.). Generally the process is useful on the naphtha boiling range material from catalytic cracker products because they contain the desired olefins and unwanted sulfur compounds. Straight run naphthas have very little olefinic material, and unless the crude source is "sour", very little sulfur.

The sulfur content of the catalytically cracked fractions will depend upon the sulfur content of the feed to the cracker as well as the boiling range of the selected fraction used as feed to the process. Lighter fractions will have lower sulfur contents than higher boiling fractions. The front end of the naphtha contains most of the high octane olefins but relatively little of the sulfur. The sulfur components in the front end are mainly mercaptans and typical of those compounds are: methyl mercaptan (b.p. 43° F.), ethyl mercaptan (b.p. 99° F.), n-propyl mercaptan (b.p. 154° F.), iso-propyl mercaptan (b.p. 135–140° F.), iso-butyl mercaptan (b.p. 190° F.), tert-butyl mercaptan (b.p. 147° F.), n-butyl mercaptan (b.p. 208° F.), sec-butyl mercaptan (b.p. 203° F.), iso-amyl mercaptan (b.p. 250° F.), n-amyl mercaptan (b.p. 259° F.), α-methylbutyl mercaptan (b.p. 234° F.), α-ethylpropyl mercaptan (b.p. 293° F.), n-hexyl mercaptan (b.p. 304° F.), 2-mercapto hexane (b.p. 284° F.), and 3-mercapto hexane (b.p. 135° F.). Typical sulfur compounds found in the heavier boiling fraction include the heavier mercaptans, thiophenes sulfides and disulfides. However, thiophene itself boils at 180° F. and can represent up to 15% of the total sulfur in the lighter naphtha fraction.

The reaction of organic sulfur compounds in a refinery stream with hydrogen over a catalyst to form $H_2S$ is typically called hydrodesulfurization. Hydrotreating is a broader term which includes saturation of olefins and aromatics and the reaction of organic nitrogen compounds to form ammonia. However hydrodesulfurization is included and is sometimes simply referred to as hydrotreating.

The lower boiling portion of the naphtha which contains most of the olefins is subjected only to conditions sufficient to transform the thiophene to n-butyl mercaptan. The partial thiophene hydrogenation catalyst is placed in the lower portion of a first naphtha splitter while the thioetherification catalyst is placed in the upper portion of the first naphtha splitter. The destructive hydrodesulfurization catalyst is placed in a second distillation column reactor to which the bottoms from the first naphtha splitter is fed.

Catalysts

Catalysts which are useful in either of the reactions utilized in the invention include the Group VIII metals. Generally the metals are deposited as the oxides on an alumina support. In the first column the catalysts are characterized as hydrogenation catalysts. The reaction of the diolefins with the sulfur compounds (thioetherification) is selective over the reaction of hydrogen with olefinic bonds. The preferred catalysts are palladium and/or nickel or dual bed as shown in U.S. Pat. No. 5,595,643, which is incorporated herein by reference, since in the first column the sulfur removal is carried out with the intention to preserve the olefins. Although the metals are normally deposited as oxides, other forms may be used. The nickel is believed to be in the sulfide form during the hydrogenation.

In the second and subsequent columns, it is the purpose of the catalyst to destroy the sulfur compounds to produce a hydrocarbon stream containing $H_2S$ which is easily separated from the heavier components therein. In the second and subsequent columns the concern for the olefins is not a feature, since the olefins have largely been separated as overheads in the first column. The focus of these later columns is to carry out destructive hydrogenation of the sulfides and other organic sulfur compounds. For this purpose hydrodesulfurization catalysts comprising two metal oxides supported on an alumina base, wherein the metal oxides are chosen from the group consisting of molybdenum, cobalt, nickel, tungsten and mixtures thereof are preferred. More preferably cobalt modified with nickel, molybdenum, tungsten and mixtures thereof is the preferred catalyst. A similar catalyst may be used for the hydrogenation of the thiophene to n-butyl mercaptan.

The catalysts may be supported. The supports are usually small diameter extrudates or spheres. The catalysts are preferably prepared in the form of a catalytic distillation structure. The catalytic distillation structure must be able to function as catalyst and as mass transfer medium. The catalyst must be suitably supported and spaced within the column to act as a catalytic distillation structure. The catalytic distillation structure is able to function as catalyst and as mass transfer medium. The catalyst is preferably supported and spaced within the column to act as a catalytic distillation structure. Catalytic distillation structures useful for this purpose are disclosed in U.S. Pat. Nos. 4,731,229, 5,073,236, 5,431,890, 5,266,546 and 5,730,843 which are incorporated by reference. The preferred structure embodiment is described in U.S. Pat. No. 5,431,890 which is hereby incorporated by reference.

Thioetherification Catalysts

A suitable catalyst for the thioetherification reaction is 0.34 wt. % Pd on 7 to 14 mesh $Al_2O_3$ (alumina) spheres, supplied by United Catalysts Inc. designated as G-68C. Typical physical and chemical properties of the catalyst as provided by the manufacturer are as follows:

TABLE I

| Designation | G-68C |
|---|---|
| Form | Sphere |
| Nominal size | 7 × 14 mesh |
| Pd. wt. % | 0.3 (0.27–0.33) |
| Support | High purity alumina |

The catalyst is believed to be the hydride of palladium which is produced during operation. The hydrogen rate to the reactor must be sufficient to maintain the catalyst in the active form because hydrogen is lost from the catalyst by hydrogenation, but kept below that which would cause flooding of the column which is understood to be the "effectuating amount of hydrogen" as that term is used herein. Generally the mole ratio of hydrogen to diolefins and acetylenes in the feed is at least 1.0 to 1.0 and preferably 2.0 to 1.0.

The thioetherification catalyst also catalyzes the selective hydrogenation of polyolefins contained within the light cracked naphtha and to a lesser degree the isomerization of some of the mono-olefins. Generally the relative rates of reaction for various compounds are in the order of from faster to slower:

(1) reaction of diolefins with mercaptans
(2) hydrogenation of diolefins
(3) isomerization of the mono-olefins
(4) hydrogenation of the mono-olefins.

The reaction of interest is the reaction of the mercaptans with diolefins. In the presence of the catalyst the mercaptans will also react with mono-olefins. However, there is an excess of diolefins to mercaptans in the light cracked naphtha feed and the mercaptans preferentially react with them before reacting with the mono-olefins. The equation of interest which describes the reaction is:

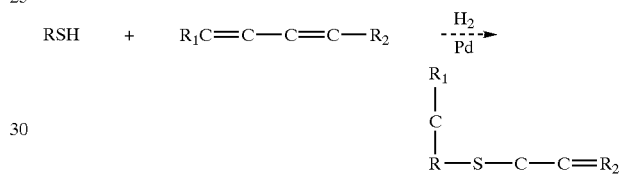

This may be compared to the HDS reaction described below which consumes hydrogen. The only hydrogen consumed in the removal of the mercaptans in the present invention is that necessary to keep the catalyst in the reduced "hydride" state. If there is concurrent hydrogenation of the dienes, then hydrogen will be consumed in that reaction.

HDS Catalyst

A preferable catalyst for the destructive hydrogenation of the sulfur compounds (hydrodesulfurization) is 58 wt. % Ni on 8 to 14 mesh alumina spheres, supplied by Callcicat, designated as E-475-SR. Typical physical and chemical properties of the catalyst as provided by the manufacturer are as follows:

TABLE II

| Designation | E-475-SR |
|---|---|
| Form | Spheres |
| Nominal size | 8 × 14 Mesh |
| Ni wt.% | 54 |
| Support | Alumina |

Catalysts which are useful for the hydrodesulfurization reaction include Group VIII metals such as cobalt, nickel, palladium, alone or in combination with other metals such as molybdenum or tungsten on a suitable support which maybe alumina, silica-alumina, titania-zirconia or the like. Normally the metals are provided as the oxides of the metals supported on extrudates or spheres and as such are not generally useful as distillation structures.

The catalysts may additionally contain components from Group V and VIB metals of the Periodic Table or mixtures thereof. The use of the distillation system reduces the deactivation and provides for longer runs than the fixed bed hydrogenation units of the prior art. The Group VIII metal provides increased overall average activity. Catalysts containing a Group VIB metal such as molybdenum and a Group VIII such as cobalt or nickel are preferred. Catalysts suitable for the hydrodesulfurization reaction include cobalt-molybdenum, nickel-molybdenum and nickel-tungsten. The metals are generally present as oxides supported on a neutral base such as alumina, silica-alumina or the like. The metals are reduced to the sulfide either in use or prior to use by exposure to sulfur compound containing streams.

The properties of a typical hydrodesulfurization catalyst are shown in Table III below.

TABLE III

| Manufacture | Criterion Catalyst Co. |
|---|---|
| Designation | C-448 |
| Form | Tri-lobe Extrudate |
| Nominal size | 1.2 mm diameter |
| Metal, Wt. % | |
| Cobalt | 2–5% |
| Molybdenum | 5–20% |
| Support | Alumina |

The catalyst typically is in the form of extrudates having a diameter of 1/8, 1/16 or 1/32 inches and an L/D of 1.5 to 10. The catalyst also may be in the form of spheres having the same diameters. In their regularform they form too compact a mass and are preferably prepared in the form of a catalytic distillation structure. The catalytic distillation structure must be able to function as catalyst and as mass transfer medium.

Reaction Conditions

In the first distillation column reactorthe pressure is maintained at about 0 to 250 psig with the corresponding temperature in the lower distillation reaction zone of between 270 and 450° F. or more and in the upper distillation zone of between 130 to 270° F. Hydrogen partial pressures of 0.1 to 70 psia, more preferably 0.1 to 10 are used, with hydrogen partial pressures in the range of 0.5 to 50 psia giving optimum results.

The conditions suitable for the hydrodesulfurization of naphtha in the second distillation column reactor are very different from those in a standard trickle bed reactor, especially with regard to total pressure and hydrogen partial pressure. In the second column a low total pressure in the range of 25 to less than 300 psig is required for the hydrodesulfurization and hydrogen partial pressure of less than 150 psi, preferably down to 0.1 psi can be employed preferably about 15 to 50 psi. The temperature in the distillation reaction zone is between 400 to 750° F. Hydrogen for the second distillation column reactor is fed in the range of one to ten standard cubic feet (SCF) per pound of feed. Nominal liquid hourly space velocities (liquid volume of feed per unit volume of catalyst) in the second column are in the range of 2–5. Typical conditions in a reaction distillation zone (second and subsequent columns) of a naphtha hydrodesulfurization distillation column reactor are:

| Temperature | 450–700° F. |
|---|---|
| Total Pressure | 75–300 psig |
| $H_2$ partial pressure | 6–75 psia |
| LHSV of naphtha | about 1–5 |
| $H_2$ rate | 10–1000 SCFB |

The operation of the distillation column reactor results in both a liquid and vapor phase within the distillation reaction zone. A considerable portion of the vapor is hydrogen while a portion is vaporous hydrocarbon from the petroleum fraction. Actual separation may only be a secondary consideration.

Without limiting the scope of the invention it is proposed that the mechanism that produces the effectiveness of the present process is the condensation of a portion of the vapors in the reaction system, which occludes sufficient hydrogen in the condensed liquid to obtain the requisite intimate contact between the hydrogen and the sulfur compounds in the presence of the catalyst to result in their hydrogenation. In particular, sulfur species concentrate in the liquid while the olefins and $H_2S$ concentrate in the vapor allowing for high conversion of the sulfur compounds with low conversion of the olefin species.

The result of the operation of the process in the distillation column reactor is that lower hydrogen partial pressures (and thus lower total pressures) may be used. As in any distillation there is a temperature gradient within the distillation column reactor. The temperature at the lower end of the column contains higher boiling material and thus is at a higher temperature than the upper end of the column. The lower boiling fraction, which contains more easily removable sulfur compounds, is subjected to lower temperatures at the top of the column which provides for greater selectivity, that is, less hydrocracking or saturation of desirable olefinic compounds. The higher boiling portion is subjected to higher temperatures in the lower end of the distillation column reactor to crack open the sulfur containing ring compounds and hydrogenate the sulfur.

It is believed that in the present distillation column reaction is a benefit first, because the reaction is occurring concurrently with distillation, the initial reaction products and other stream components are removed from the reaction zone as quickly as possible reducing the likelihood of side reactions and reverse reactions. Second, because all the components are boiling the temperature of reaction is controlled by the boiling point of the mixture at the system pressure. The heat of reaction simply creates more boil up, but no increase in temperature at a given pressure. As a result, a great deal of control over the rate of reaction and distribution of products can be achieved by regulating the system pressure. A further benefit that this reaction may gain from distillation column reactions is the washing effect that the internal reflux provides to the catalyst thereby reducing polymer buildup and coking.

Finally, the upward flowing hydrogen acts as a stripping agent to help remove the $H_2S$ which is produced in the distillation reaction zone of the second and subsequent columns.

The catalyst is placed in the distillation column reactors such that the selected portion of the naphtha is contacted with the catalyst and treated to prevent the $H_2S$ produced from further contact with the catalyst bed. The first naphtha splitter fractionates the naphtha into a light cracked naphtha (LCN) as overheads and a heavier stream as bottoms. The second splitter fractionates the bottoms from the first splitter into an intermediate cracked naphtha (ICN) as overheads and a heavy cracked naphtha (HCN) as bottoms.

In the first splitter catalyst is placed in the stripping section to hydrogenate the thiophene to n-butyl mercaptan and in the rectification section to react the mercaptans with diolefins to produce sulfides (thioetherification) which are removed in the bottoms with the heavier stream. In the second splitter the catalyst is also placed in the middle section to catalytically react the organic sulfur boiling in the ICN range (including the sulfides produced in the first splitter) with hydrogen to produce $H_2S$. The $H_2S$ is immediately removed in the overheads along with the ICN and is easily separated by flashing or further fractionation. The HCN from the second splitter may be subjected to hydrodesulfurization in another distillation column reactor or a standard single pass fixed bed reactor.

The light naphtha, intermediate naphtha and heavy naphtha streams recovered from lines 106, 205 and 303 respectively may be recombined to form a full boiling range naphtha having a total sulfur content of less than 50 ppm.

The figure shows a preferred embodiment of the invention.

A full boiling range FCC naphtha and hydrogen are fed to the first distillation column reactor 10 via flow lines 101 and 102, respectively. The thiophene hydrogenation catalyst is in a form to act as distillation structure and contained in a first reaction distillation zone 16 in the lower or stripping section of the column and the thioetherification catalyst is placed in a second reaction distillation zone 12 in the upper or rectification section of the distillation column reactor 10. In the first reaction distillation zone 16 the thiophene is converted to n-butyl mercaptan which boils upward along with the lighter naphtha containing now predominantly mercaptans as the only sulfur compounds. In the second reaction distillation zone 12 substantially all of the mercaptans react with a portion of the diolefins to form higher boiling sulfides which are distilled downward into the stripping section 15 and removed as bottoms via line 103 along with the heavier material. An LCN boiling in the range of $C_5$ to 180° F. is taken as overheads via flow line 108 and passed through condenser 13 where the condensible materials are condensed. The liquids are collected in accumulator 18 where the gaseous materials, including any unreacted hydrogen, are separated and removed via flow line 105. The unreacted hydrogen may be recycled (not shown) if desired. The liquid distillate product is removed via flow line 106. Some of the liquid is returned to the column 10 as reflux via line 107. A section 14 between the two distillation reaction zones contains standard distillation apparatus such as inert packing, bubble cap trays, sieve trays, valve trays or the like.

The bottoms are fed to second distillation column reactor 20 via flow line 103 and hydrogen is fed via flow line 202. The second distillation column reactor also has a suitable catalyst bed 22 in the middle portion of the distillation column reactor 20. Organic sulfur compounds contained in the portion boiling upward into the catalyst bed 22 (including a portion or all of the sulfides from the first distillation column reactor 10) react with hydrogen to form $H_2S$ which is immediately withdrawn as overheads along an intermediate boiling range naphtha, ICN (180–300° F.) via flow line 204. The heaviest boiling material, HCN is withdrawn as bottoms via flow line 203. Stripping section 26 is provided to assure complete separation of the ICN and HCN and to assure stripping of any $H_2S$. The ICN and unreacted hydrogen and any lighter material produced in the reactor is passed through condenser 30 wherein the ICN is condensed and collected in receiver/separator 40. Product ICN is withdrawn from the receiver via flow line 205. A portion of the condensed ICN is returned to the distillation column reactor 20 as reflux via flow line 207. The uncondensed vapors containing $H_2S$ and hydrogen are removed via flow line 208.

The bottoms from the second distillation column in flow line 203 may be fed to a third distillation column reactor or a fixed bed reactor for further desulfurization of the heavy naphtha. All three naphthas may then be recombined to form a full boiling range naphtha with a much lower total sulfur content.

The invention claimed is:

1. A process for the desulfurization of a full boiling range naphtha comprising the steps of:
  (a) feeding (1) a full boiling range naphtha containing olefins, diolefins, organic sulfur compounds comprising mercaptans and thiophene and (2) hydrogen to a first distillation column reactor;
  (b) concurrently in said first distillation column reactor;
    (i) contacting the thiophene contained within said full boiling range naphtha in the presence of a hydrogenation catalyst in a first distillation reaction zone in the lower section of said first distillation column reactor to convert a portion of the thiophene to n-butyl mercaptan,
    (ii) contacting the diolefins and mercarptans in the presence of a Group VIII metal catalyst in a second distillation reaction zone in the upper section of said distillation column reactor thereby reacting a portion of said mercaptans with a portion of the diolefins to form sulfide products and a distillate product and
    (iii) fractionating said full boiling range naphtha into a light naphtha and a heavier naphtha, said heavier naphtha containing said organic sulfur compounds and said sulfide products;
  (c) removing said distillate product as a first overheads from said first distillation column reactor;
  (d) removing said heavier naphtha from said first distillation column reactor as bottoms;
  (e) feeding said bottoms and hydrogen to a second distillation column reactor;
  (f) concurrently in said second distillation column reactor;
    (i) contacting sulfur compounds comprising the organic sulfur compounds in said heavier naphtha with hydrogen in the presence of a hydrodesulfurization catalyst in a hydrodesulfurization zone to convert a portion of said organic sulfur compounds to hydrogen sulfide, and
    (ii) fractionating said heavier naphtha into an intermediate naphtha having a boiling range of about 160° F. to about 300° F. and a heavy naphtha;
  (g) removing said intermediate naphtha and said hydrogen sulfide from said second distillation column reactor as a second overheads; and
  (h) removing said heavy naphtha containing sulfur compounds comprising said sulfides from said distillation column reactor as a second bottoms.

2. The process according to claim 1 wherein said light naphtha has a boiling range of $C_5$ to about 180° F., said heavier naphtha has a boiling range of above 180° F., said intermediate naphtha has a boiling range of about 180° F. to about 300° F. and said heavy naphtha has a boiling range of above about 300° F.

3. The process according to claim 2 wherein said Group VIII metal catalyst comprises a supported nickel catalyst and said hydrodesulfurization catalyst comprises 2–5 wt. % cobalt and 5–20 wt. % molybdenum on an alumina support.

4. The process according to claim 1 wherein said hydrodesulfurization catalyst comprises 2–5 wt. % cobalt and 5–20 wt. % molybdenum on an alumina support.

5. The process according to claim 1 wherein the naphtha products are recombined and the total sulfur content of the recombined product is less than 50 wppm.

6. A process for the desulfurization of a full boiling range catalytically cracked naphtha comprising the steps of:
  (a) feeding (1) a full boiling range cracked naphtha containing olefins, diolefins and organic sulfur compounds comprising mercaptans and thiophene and (2) hydrogen to a first distillation column reactor;
  (b) concurrently in said first distillation column reactor
    (i) contacting the thiophene contained within said full boiling range naphtha in the presence of a hydrogenation catalyst in a first distillation reaction zone in the lower section of said first distillation column reactor to convert a substantial portion of the thiophene to n-butyl mercaptan, (i) contacting the diolefins and mercaptans in said full boiling range naphtha and the n-butyl mercaptan produced in said first distillation reaction zone in the presence of a Group VIII metal catalyst in a second distillation reaction zone in the upper section of said distillation column reactor thereby reacting a portion of said mercaptans with a portion of the diolefins to form sulfide products and a distillate product and (iii) fractionating said full boiling range naphtha into a light naphtha and a heavier naphtha, said heavier naphtha containing said organic sulfur compounds and said sulfide products;

(c) removing said distillate product as a first overheads from said first distillation column reactor;

(d) removing said heavier naphtha from said first distillation column reactor as bottoms;

(e) feeding said bottoms and hydrogen to a second distillation column reactor;

(f) concurrently in said second distillation column reactor (i) contacting sulfur compounds comprising the organic sulfur compounds contained within said heavier naphtha with hydrogen in the presence of a hydrodesulfurization catalyst in a hydrodesulfurization section of said second distillation column reactor to convert a portion of said organic sulfur compounds to hydrogen sulfide, and (ii) fractionating said heavier naphtha into an intermediate naphtha having a boiling range of about 180° F. to about 300° F. and a heavy naphtha boiling above about 300° F.;

(g) removing said intermediate naphtha containing sulfur compounds comprising said sulfides and said hydrogen sulfide from said second distillation column reactor as a second overheads; and (h) removing said heavy naphtha from said distillation column reactor as a second bottoms.

7. The process according to claim 6 wherein said hydrodesulfurization catalyst comprises 2–5 wt. % cobalt and 5–20 wt. % molybdenum on an alumina support.

8. The process according to claim 6 wherein the naphtha products are recombined and the total sulfur content of the recombined product is less than 50 wppm.

* * * * *